May 23, 1939. J. F. CULLIN 2,159,886
WIND PROPELLED GENERATOR
Filed Sept. 7, 1937
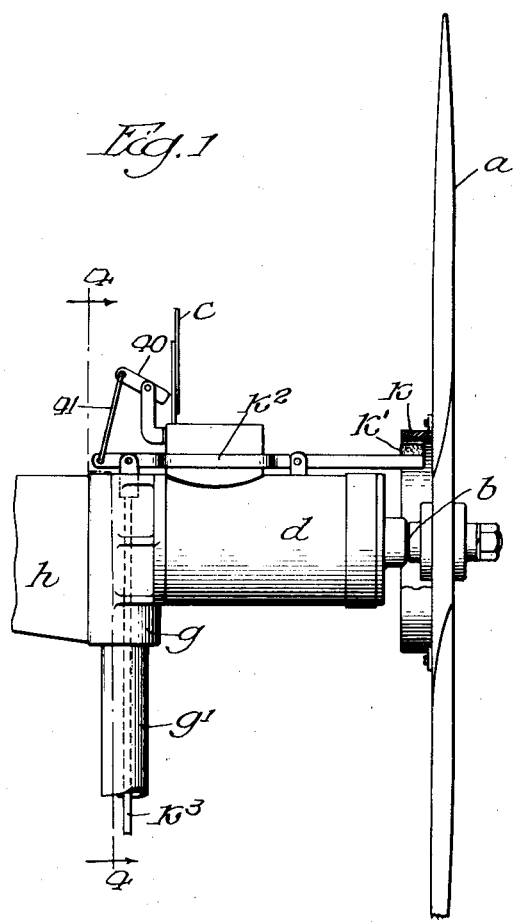
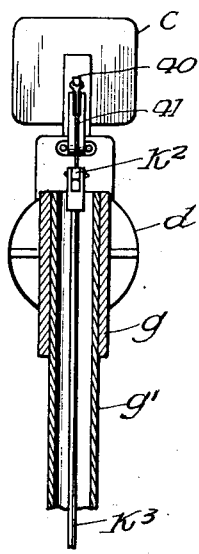
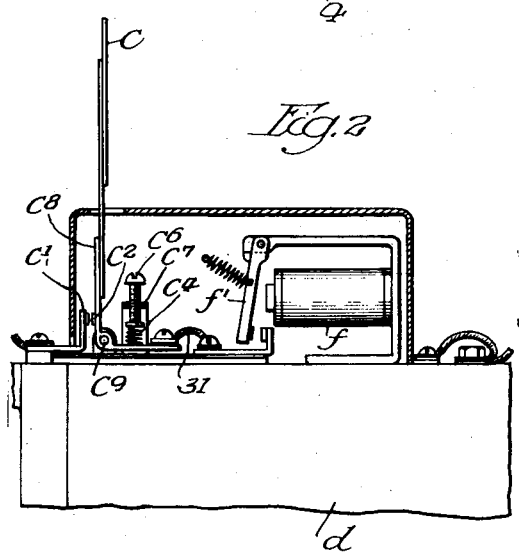
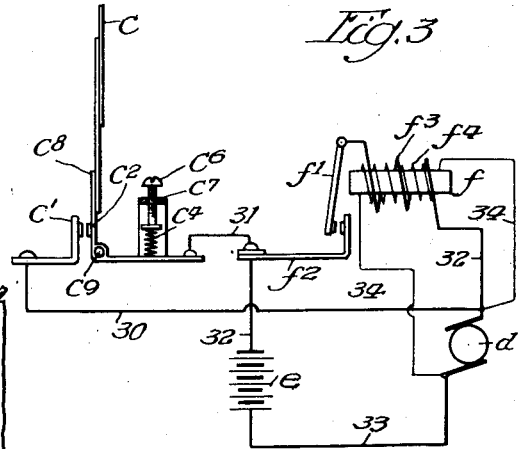
Inventor
Jasper F. Cullin Patented May 23, 1939

2,159,886

UNITED STATES PATENT OFFICE 2,159,886

WIND PROPELLED GENERATOR

Jasper F. Cullin, Detroit, Mich., assignor, by direct and mesne assignments, of two-thirds to Leu Mervis, Chicago, Ill.

Application September 7, 1937, Serial No. 162,669

2 Claims. (Cl. 290—44)

The invention relates to wind-operated electric generators.

In the operation of this type of generator, difficulty is frequently experienced in starting the propeller and generator because of the frictional resistance to starting in the bearings and speed-change gearing which is frequently used between the propeller and the generator. In cold weather, grease in the bearings and gearings becomes congealed and produces such high resistance to the starting of the generator and propeller that a much higher wind velocity is necessary to start the propeller in motion than is necessary for its operation after it has accelerated sufficiently to drive the generator for generating current.

One object of the invention is to provide controlling-means for wind-propelled generators in which current from the battery charged by the generator is utilized to assist the wind in starting the propeller and accelerating it until it has reached a sufficiently high speed for generating current. By this means the propeller can be started at any predetermined wind velocity which is sufficient to keep it in motion for driving the generator, notwithstanding the initial resistance to starting the propeller and generator when they are idle.

Another object of the invention is to provide control means which includes the automatic cut-out for the charging circuit.

Another object of the invention is to provide improved controlled means for wind-propelled generators which is simple in construction and efficient in operation.

Other objects of the invention will appear from the detailed description.

The invention consists in the several novel features which are hereinafter set forth and are more particularly defined by claims at the conclusion hereof.

In the drawing: Fig. 1 is a view partly in section and partly in elevation, of a wind-propelled generator and the improved control-means. Fig. 2 is a section of the switching mechanism of the control-means. Fig. 3 is a diagram of the electrical connections and apparatus. Fig. 4 is a section on line 4—4 of Fig. 1.

The invention is exemplified as applied to a propeller-wheel $a$ which is mounted on, and adapted to drive, a shaft $b$ which is carried in the casing of, and suitably connected to drive, an electric generator $d$. Speed-change gearing of any suitable construction may be interposed between the propeller-wheel and the generator $d$ to operate the generator at sufficient speed to generate current to charge battery $e$, as well understood in the art. The generator-casing is mounted upon a vertical sleeve $g$ which is attached to a tubular mast $g'$ which is usually rotatably supported to permit the axis of the propeller to swing into the direction of the wind under control of the usual vane $h$ applied to the sleeve $g$, as well understood in the art. The propeller is usually equipped with a brake-drum $k$ which is adapted to be engaged by a brake-shoe $k'$ on a lever $k^2$ which is fulcrumed on the generator-casing and connected to a rod $k^3$ which extends through the hollow mast $g'$ to a suitable point where it is accessible for manual manipulation. This means permits the propeller-wheel to be controlled manually.

The controlling-means comprises a vane $c$ which is fixed to the vertical arm of a lever $c^3$ which is pivoted at $c^9$ on the generator-casing, and extends transversely to the axis of the propeller so that it will be swung by wind-pressure on its fulcrum $c^9$ when the velocity of the wind reaches a predetermined point at which it is desired to automatically start the propeller-wheel for driving the generator. A spring $c^4$ is applied to an arm on the vane and the resistance of the spring may be varied by a screw $c^6$ which is confined in a bracket $c^7$. By adjustment of the screw $c^6$ the wind-pressure required to shift the vane $c$ may be varied to cause the propeller to be started by the generator at different predetermined velocities of the wind. Vane $c$ carries a fixed contact $c^2$ which is adapted to engage a contact $c'$ when the vane $c$ is shifted by the wind to start the propeller.

The controlling-means also comprises an electro-magnet $f$ which includes a helix $f^3$ which is connected to an arm $f^1$ which is operated when the magnet is energized and is adapted to engage, and is normally disengaged from, a fixed contact-strip $f^2$, and a high resistance helix $f^4$ which is included in a shunt-circuit 34 around the generator $d$. This equipment is electrically connected to the battery $e$ and generator $d$, as illustrated in Fig. 3. Contact $c'$ is connected by a conductor 30 to the generator $d$. The vane-operated lever $c^8$ is connected by a conductor 31, contact $f^2$ and conductor 32 to battery $e$, as illustrated in Fig. 3.

When the propeller-wheel is idle and there is insufficient wind-pressure to move the controlling vane $c$, the circuit through the battery $e$ and generator $d$ will be interrupted at contact $c'$ and lever $c^8$ and the generating circuit will be interrupted at arm $f'$ and contact $f^2$.

When the velocity of the wind increases to a point which will be sufficient for driving the generator from the propeller-wheel $g$ but insufficient to overcome the retardance to starting resulting from friction of the parts and the hardening of the grease used in the bearings and the speed-change gearing, the vane $c$ will swing lever $c^8$ on its fulcrum $c^9$ against the force of spring $c^4$ and bring the lever into engagement with contact $c'$, whereupon a circuit for causing the battery $e$ to drive the generator $d$ will be established as follows: battery $e$, conductor 33, generator $d$, conductor 30, contact $c'$, lever $c^8$, conductor 31, contact $f^2$ and conductor 32.

This circuit will cause current from the battery to cause the generator $d$ to act as a motor and co-act with the wind in starting the propeller. The power of the generator will overcome the initial resistance to the starting of the propeller until the propeller has accelerated to the point where its speed is sufficiently high to drive the generator for charging the battery. During this operation the energy in the battery passes through the windings of the generator and causes the latter to revolve as a motor for supplying sufficient driving power to the propeller to cause it to overcome the initial drag and cause it to start. The power furnished by the generator supplies the deficiency in the wind velocity to start the propeller.

After the propeller has been accelerated to the speed where it will drive the generator $d$ to charge the battery $e$, current from the generator will pass through the high resistance-helix $f^4$ of the magnet $f$ which is in the shunt-conductor 34 which leads around the generator. The magnet will be energized to shift the arm $f'$ into engagement with the contact $f^2$ and this will establish a circuit which cuts out the vane-controlled switch $c'$, $c^8$, and includes the generator $d$, conductor 32, and helix $f^3$ and arm $f'$, contact $f^2$, conductor 32, battery $e$ and conductor 33. The generator will then charge the battery. This apparatus serves to automatically open the charging-circuit when the propeller speed is decreased so it will be insufficient for charging.

A lever 40 is pivotally supported on the generator-casing, is connected by a link 41 to brake-lever $k^2$, and is adapted to lock vane $c$ in its inoperative position, when rod $k^3$ is operated to set the brake-shoe $k'$ on brake-drum $k$ to stop the propeller. This lever 40 and its connection serve as means for rendering the vane inoperative when the propeller is inoperative.

When the velocity of the wind decreases to a point at which the generator $d$ is no longer driven at sufficient speed to generate current, magnet $f$ will be de-energized, switch $f'$ will be released to open the charging circuit at contact $f^2$, and thereby the flow of current from the generator will stop. The circuit for driving the generator from the battery will be open at $c'$, $c^2$. This condition will continue until the vane $c$ is again shifted by the increase of wind-velocity to close switch $c'$, $c^8$ and start the generator.

The invention exemplifies controlling-means for wind-driven generators equipped with means for utilizing energy from the battery charged by the generator for starting the propeller and accelerating it from its idle position until it reaches the proper speed for generating current and charging the battery. It includes means controlled by wind-pressure for controlling the starting mechanism and means for automatically interrupting the charging-circuit when the velocity of the propeller is insufficient for charging purposes.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with a wind-operable propeller, an electric generator adapted to be driven by the propeller, and a battery adapted to be charged by the generator, of controlling-means operable by wind-pressure, a circuit controlled by said means for connecting the battery to drive the generator to aid in starting the propeller, means for stopping the propeller, and means for conjointly controlling the stop-means and rendering inoperative the means operable by wind-pressure.

2. The combination with a wind-operable propeller, an electric generator adapted to be driven by the propeller, and a battery adapted to be charged by the generator, of controlling-means comprising a vane operable by wind-pressure, a switch controlled by said means, a circuit controlled by the switch for connecting the battery to drive the generator to aid in starting the propeller, means for stopping the propeller, and means for conjointly operating the stop-means and rendering the vane inoperable.

JASPER F. CULLIN.